July 14, 1936.   W. F. STIMPSON   2,047,335
WEIGHING SCALE
Filed Aug. 3, 1933   2 Sheets-Sheet 1

INVENTOR.
Walter F. Stimpson
BY Swan, Frye & Hardesty
ATTORNEYS.

July 14, 1936. W. F. STIMPSON 2,047,335
WEIGHING SCALE
Filed Aug. 3, 1933 2 Sheets-Sheet 2

INVENTOR
Walter F. Stimpson
BY Swan, Frye & Hardesty
ATTORNEYS

Patented July 14, 1936

2,047,335

UNITED STATES PATENT OFFICE 2,047,335

WEIGHING SCALE

Walter F. Stimpson, Detroit, Mich.

Application August 3, 1933, Serial No. 683,459

10 Claims. (Cl. 265—60)

This invention relates to weighing scale constructions, and more particularly to computing scales having weight-indicating charts facing both the dealer and customer, such as are commonly used in stores and shops, and especially such as are provided with adjustable weights for changing the capacity of the scale. It has been the custom to provide such scales, where it is desired that their capacity be changeable, with graduated tare beams upon which one or more slidable poises are mounted. The graduations of such tare beams are almost without exception so positioned that when the scale is installed in a shop they are not visible to customers. Accordingly, while such arrangements function satisfactorily insofar as weighing operations are concerned, they have come to be regarded with disfavor by reason of the ease with which unscrupulous merchants are enabled to cheat customers by so positioning the poises that the chart indication does not apprise the customer of either the weight of the article being weighed, or an even multiple thereof. Other tare weight arrangements, including swinging weights, have been employed, but have not come into general use, inasmuch as they also ordinarily fail to properly apprise the customer of the manner in which the chart indication of the scale has been varied, or are unduly expensive and complicated in construction, or subject to structural or mechanical limitations by reason of the imposition of unequal or undue stresses upon the bearings of the scale, or for other reasons.

An important object of this invention is the provision of a scale provided with attached but selectively usable increased capacity weights, but subject to none of the foregoing limitations or defects, so designed as to enable the capacity of the scale to be varied as desired, yet provided with means whereby the customer may be positively and constantly advised of the manner in which the scale is being used, and the sums which must be added to the chart indication to determine the proper weight.

A further object of this invention is the provision of a plurality of increased capacity weights of simple, sturdy and inexpensive construction and which will evenly distribute the varying loads applied to the bearings and prevent the transmission of undue jars or stresses thereto from the operation of the weights.

Other objects and advantages will be apparent from the following description, wherein reference is made to the accompanying drawings illustrating a preferred embodiment of my invention, and wherein similar reference numerals designate similar parts throughout the several views:

Figure 1:
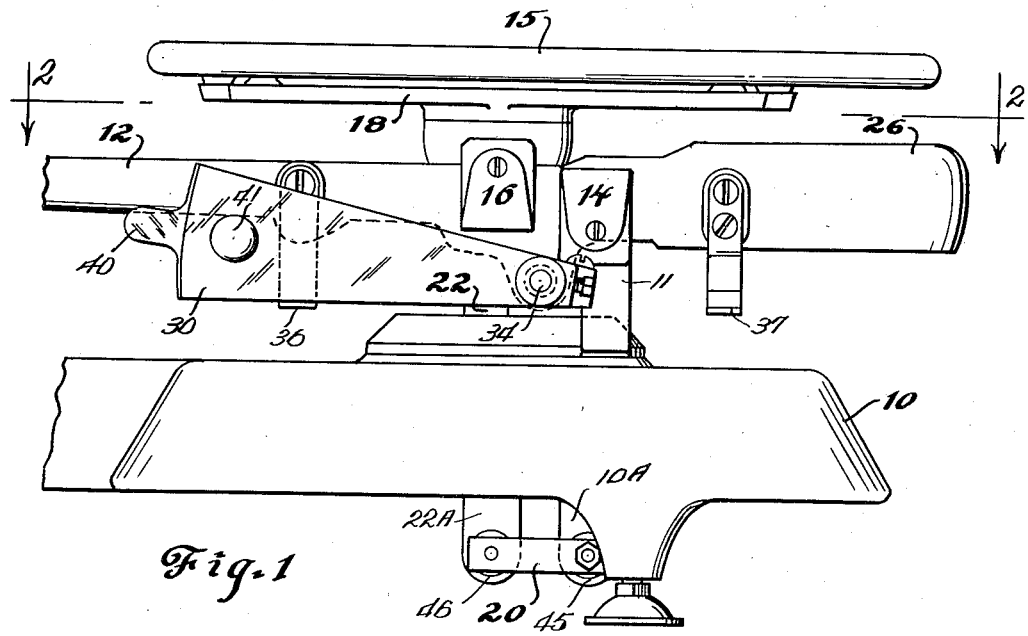
Figure 1 is a fragmentary front elevational view of a scale incorporating the principles of this invention.

Referring now to the drawings, reference character 10 designates the base of a weighing scale, here shown as a computing scale of a familiar fan type, although it will be appreciated that the invention is equally applicable to scales of many other constructions. The load counterbalancing and indicator actuating mechanism includes a main lever 12 supported upon suitable fulcrum bearings, as 14, in the yoke 11 carried by the base and in turn supporting the platform 15, as upon bearings 16 which carries the platform supporting spider 18. The lever carries at one end the partial load-counterbalancing weight 26. The platform is held in horizontal position by a suitable check link 20 acting between a continuation 22A of the downwardly extending rod 22 rigidly connected to the platform spider 18 in alignment with the platform supporting pivots 16, and a rod 10A depending from the base 10 in alignment with the fulcrum pivots 14. Preferably the check link 20 includes roller bearings 45—46 carried by the rods 10A and 22 respectively. The main lever 12 is adapted to actuate suitable additional partial load-counterbalancing and indicating mechanism (not shown) housed in the fan shaped indicator housing 24.

Many attempts have in the past been made to design an entirely satisfactory scale provided with tare or increased capacity weights forming an attached portion of the scale mechanism and either swingable or otherwise definitely movable to easily visible positions only, but none have possessed sufficient additional visibility from the customer's side of the scale, or have failed to meet other requirements.

Figure 3:
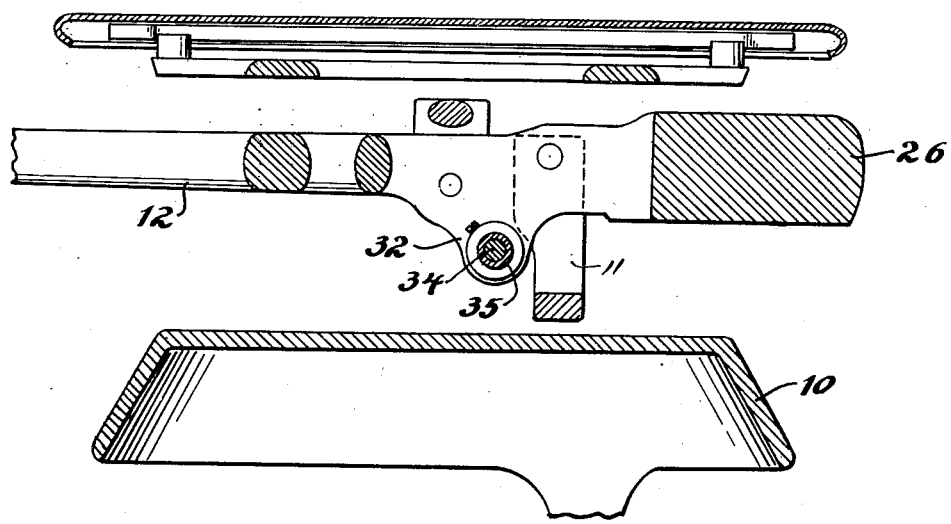
Figure 3 is a vertical section taken as if on line 3—3 of Figure 2 and looking in the direction of the arrows, but showing the platform and supporting spider.
Figure 2:
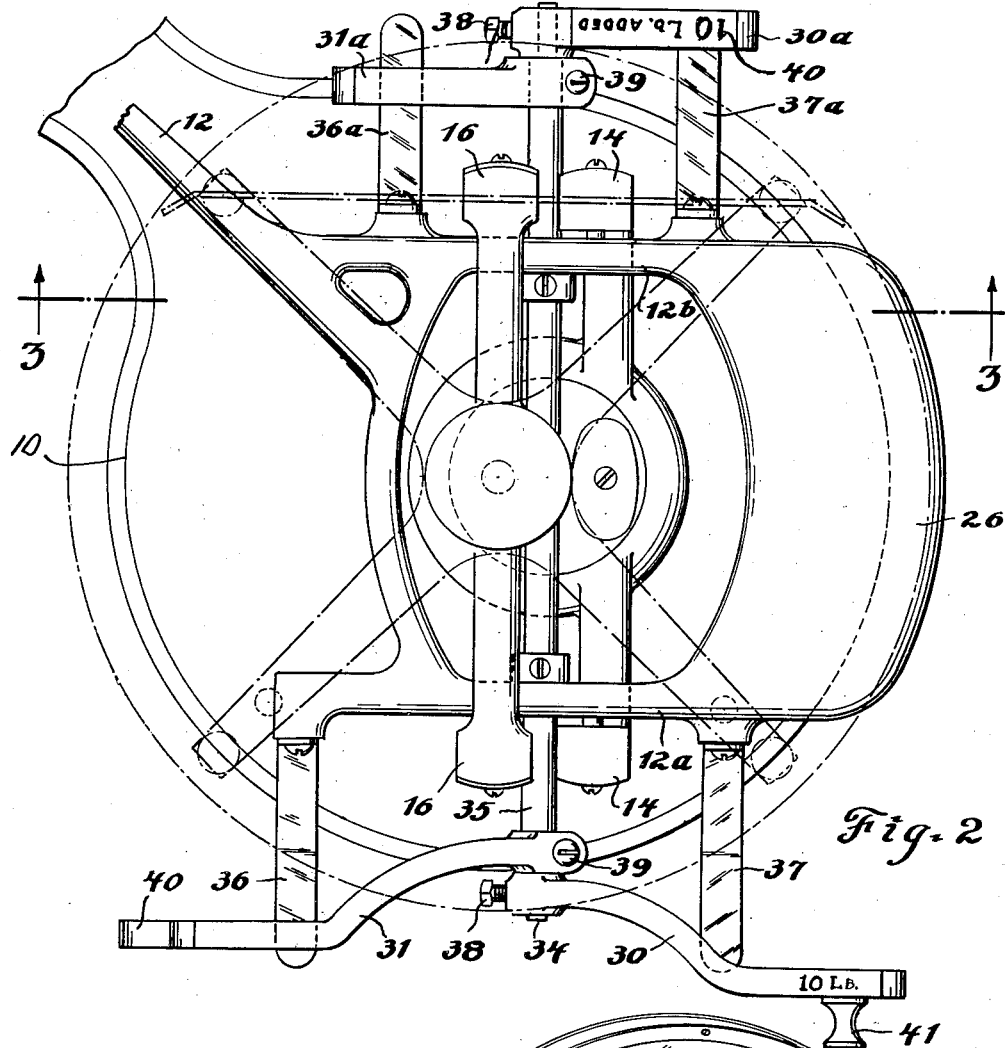
Figure 2 is a horizontal section partly in plan taken substantially on line 2—2 of Figure 1 and looking in the direction of the arrows.
Figure 4:
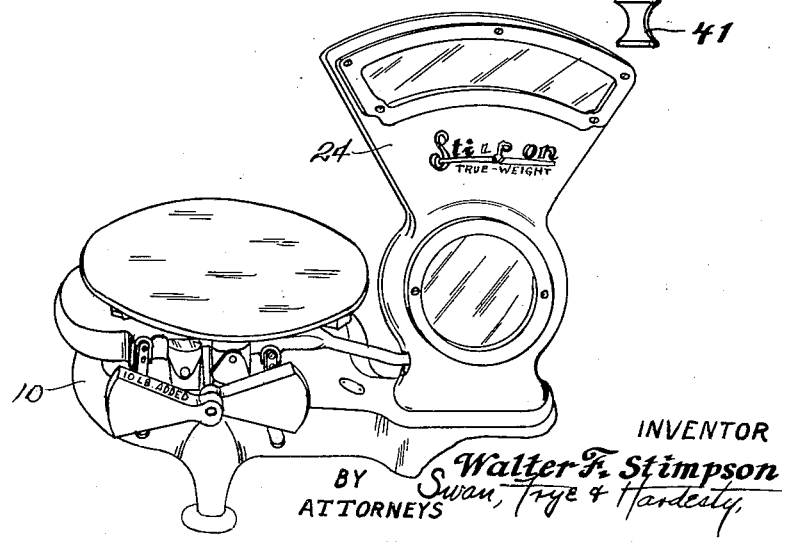
Figure 4 is a perspective view of the back or customer's side of the scale.

In my preferred construction I employ swinging tare or increased capacity weights, as 30—31 respectively, mounted on a shaft 34 and surrounding sleeve 35 journaled in bearing hangers 32 carried by and depending from the opposite arms 12a—12b of the main lever 12, and running from front to back of the scale, as best shown in Figs. 2 and 3. It will be noted that the common axis of the supporting shafts 34—35 on the projecting ends of which the weights 30—31 are respectively mounted, lies relatively very close to the common axis of the bearings 14, and between these and the bearings 16. The shafts 34—35 project from the rear as well as the front of the scale and carry on the rear or customer's side cooperating tare or increased capacity weights 30a—31a. Each of the weights 30a—31a is preferably of substantially the same weight as its cooperating front weight 30—31 respectively. Brackets 36 and 37 are suitably mounted on the main lever 12 at the front of the scale and cooperating brackets 36A and 37A on the lever 12 at the rear of the scale, substantially as shown in Figure 2, to support and limit movement of the swinging weights when moved to opposite positions, and these brackets may if desired be of spring metal or sufficiently resilient to prevent the imposition of jarring stresses upon the bearings in event the weights should be allowed to fall upon the brackets too severely; or other suitable cushioning means may be used. Clamping screws as 38—39 may be provided for rigidly securing the swinging weights to their shafts, and handles as 40—41 may be provided upon those weights mounted on the front of the scale to provide convenient means whereby the merchant may swing them to desired positions.

The swinging weights may be so proportioned and positioned that when both sets (30—30a and 31—31a) are swung to the lefthand position, as shown in Figure 1, the scale reads in the normal manner indicated by the weight indications on the chart, while the swinging of each set of weights to the right hand position adds a predetermined amount to the indicated weight, as for example, ten pounds. On the weights on the customer's or back side of the scale are marked suitable notices to indicate such weight movements and their effect, and these notices are preferably arranged to be visible only when the weights are in use to increase the capacity of the scale. A suitable arrangement is the inscription upon that side of each of the front weights (30a—31a) which is underneath and so out of sight when the weights are idle, (i. e. in the left hand position of Fig. 2) but uppermost and visible when they are in use, of a suitable notifying legend, such as "10 lb. added", (as indicated at 40, Fig. 2) or equivalent information adapted to apprise a customer as to the use of the tare weights by a storekeeper manipulating them from the opposite side of the scale. The cooperative weights on the customer's side of the scale, when so constructed and arranged, not only distribute the load imposed by the swinging weights but act to notify the customer exactly how the scale is being used, thereby assuring him that proper weight is being given and preventing fraud in the operation of the scale. It will also be seen that although the construction is one of pleasing appearance, which renders the scale more attractive to the eye in addition to the assurance it gives of proper weight, it is of extremely simple construction and inexpensive manufacture.

Moreover the mounting of the swinging weights upon the main lever below its bearings serves to stabilize the lever regardless of the varying positions of the swinging weights, and the arrangement of these mountings in a vertical plane between the ball bearings of the check link mechanism serves to impose the least stresses thereupon.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In a weighing scale, a supporting base, fulcrum bearings carried thereby, a main lever supported by said bearings and having spaced side arm portions, load counterbalancing means including a weight connected to the lever, and means for changing the effective value of the load counterbalancing means to vary the capacity of the scale, including pivotal weight supporting means carried by and lying close to the fulcrum of the lever, and substantially equal weights swingably carried by said last mentioned supporting means, one arranged adjacent and outside each of said side arms.

2. In a weighing scale, a supporting base, fulcrum bearings carried thereby, a main lever supported by said bearings and having spaced side arm portions, load counterbalancing means including a weight connected to the lever, and means for changing the effective value of the load counterbalancing means to vary the capacity of the scale, including pivotal weight supporting means carried by and lying close to the fulcrum of the lever, substantially equal weights swingably carried by said last mentioned supporting means, one arranged adjacent each of said side arms, and resilient stops also carried by said lever for limiting swinging movement of said weights.

3. In a weighing scale including load counterbalancing means, a main lever having spaced arms, a load-receiving platform supported by the lever, and means for changing the effective value of the load counterbalancing means, including a pair of weights supported by said main lever and arranged upon opposite sides of said spaced arms, the weights being movable to different positions to change the capacity of the scale.

4. In a weighing scale including load counterbalancing means, a supporting base, a pair of spaced bearings carried thereby, a main lever fulcrumed on the bearings and having spaced side arms, additional bearings carried by the side arms of said lever, a load receiving platform mounted on said last mentioned bearings, a shaft rotatably carried by the lever and projecting through and from said side arms between the fulcrum and platform bearings, and weights affixed to the projecting extremities of said shaft and swingable to different positions to change the effective value of the load counterbalancing means.

5. In a weighing scale, a supporting base, a pair of spaced bearings carried thereby, a main lever fulcrumed on the bearings and having spaced side arm portions, load counterbalancing means including a weight connected to the lever, platform bearings carried by the side arms of the lever, a load-receiving platform mounted on said last mentioned bearings, a shaft journaled in and projecting through and from said side arms and close to the fulcrum bearings, and weights affixed to the projecting ends of said shaft for changing the effective value of the load counterbalancing means.

6. In a weighing scale, a support, fulcrum bearings carried thereby, a main lever mounted in said bearings, load counterbalancing means including a weight connected to the lever, and means for changing the effective value of the weight to vary the capacity of the scale, including pivotal weight-supporting means carried by the lever and having its fulcrum close to the fulcrum of the lever, a swingable weight carried by said last mentioned supporting means, and additional means for supporting the weight from the lever with the center of mass of the weight below the lever.

7. In a weighing scale, a support, fulcrum bearings carried thereby, a main lever mounted in said bearings and having spaced side arms, load counterbalancing means connected to the lever, and means for changing the effective value of the load counterbalancing means to vary the capacity of the scale, including pivotal weight-supporting means carried by the side arms of said lever, and lying close to but below the fulcrum bearings, and interconnected swingable weights carried by said last mentioned supporting means.

8. In a weighing scale, a support, fulcrum bearings carried thereby, a main lever mounted in said bearings and having spaced side arms, platform bearings carried by said lever side arms, load counterbalancing means connected to the lever, and means for changing the effective value of the counterbalancing means to vary the capacity of the scale, including weights swingably supported by each of said spaced side arms, means connecting said weights for simultaneous movement, and cushioned stop means for limiting swinging movement of the weights.

9. In a weighing scale, a support, fulcrum bearings carried thereby, a main lever mounted in said bearings and having spaced side arm portions, load counterbalancing means connected to said lever, means for changing the effective value of the counterbalancing means to vary the capacity of the scale, including shaft bearings oppositely carried by said lever side arms, interfitted shafts carried by said last mentioned bearings and projecting from the side arms at the front and back of the scale, and a weight secured to the opposite end of each shaft, whereby the weights are swingable in pairs to different positions.

10. In a weighing scale, a support, fulcrum bearings carried thereby, a main lever mounted in said bearings and having spaced side arm portions, load counterbalancing means connected to said lever, means for changing the effective resistance of the counterbalancing means to vary the capacity of the scale, including shaft bearings oppositely carried by said lever side arms and lying close to the fulcrum bearings but below the same, a plurality of interfitted shafts rotatably carried by said shaft bearings and each projecting from said lever side arms at both the front and back of the scale, and a weight secured to each end of each shaft, whereby the weights are swingable in pairs to different positions.

WALTER F. STIMPSON.